March 12, 1963    E. W. TICKNER ET AL    3,080,753
FLUID LEVEL INDICATOR FOR BATTERIES
Filed March 7, 1960

INVENTORS
EDWARD W. TICKNER
AND JOHN B. FLEMING
BY
Attorney

ય3,080,753
FLUID LEVEL INDICATOR FOR BATTERIES
Edward W. Tickner, 131 Shelbourne Road, and John B.
Fleming, 36 Woodlawn St., both of Rochester, N.Y.
Filed Mar. 7, 1960, Ser. No. 13,273
5 Claims. (Cl. 73—306)

The present invention relates to devices for indicating the level of the liquid in electric storage batteries.

Devices heretofore provided for indicating the level of liquid in the cells of storage batteries have usually been required to be made as part of the batteries, thereby making the batteries themselves special. Moreover, they have been relatively expensive and complicated in construction. Furthermore, they indicated only the liquid level in a cell of the battery and not the condition of the cell itself.

One of the objects of the present invention is to provide a liquid level indicator for storage batteries which is separate from the battery itself and which can therefore be used on any standard battery.

Another object of this invention is to provide an improved indicator of the character described which is extremely simple in its construction and dependable in its operation.

Another object of the invention is to provide an indicator of the character described which can be calibrated to serve the double purpose of giving an indication of the condition of a battery cell as regards charge as well as an indication of the level of liquid in the battery cell.

Other objects of this invention will become apparent hereinafter from the specification, the accompanying drawing, and the appended claims.

Figure 1:
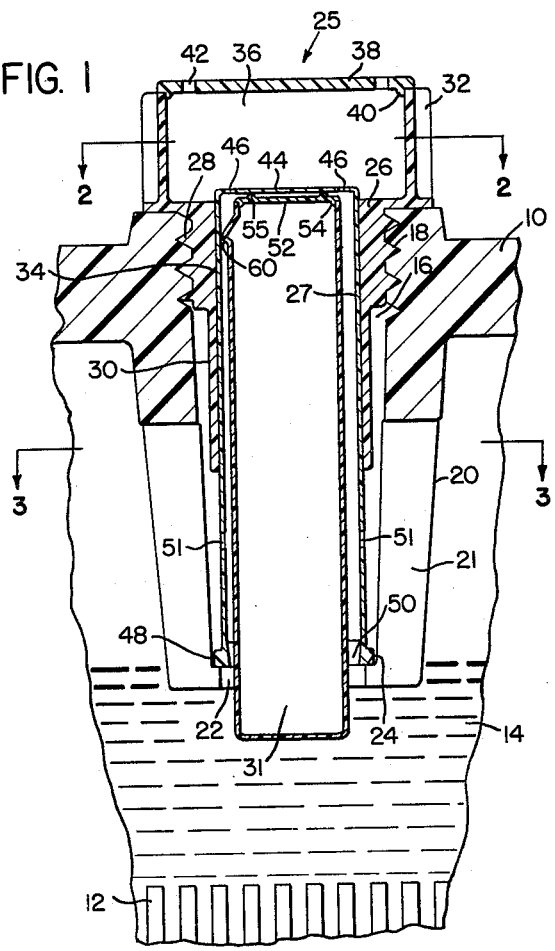
FIG. 1 is a fragmentary sectional view of a battery cell showing an indicator constructed according to one embodiment of this invention, and further showing the indicator in the position it assumes when the level of the liquid is normal, and the battery is fully charged.

Both illustrated embodiments of the invention provide a device which indicates when the liquid level of the battery is low or when its specific gravity is below normal. Since each conventional storage battery has a plurality of individual cells, a separate indicator will be used for each cell. In both illustrated embodiments of the invention the indicator comprises a float which is mounted in a transparent plastic guide tube. The float is weighted so that its top engages a window in the top of the guide tube when the liquid in the battery is at normal or manufacturer's recommended level. Furthermore, the float is so designed that if it indicates that the liquid level in a cell is low, and if, upon removal of the battery cap to replenish the liquid, it is found that the liquid is not low, then it will be obvious that the specific gravity of the liquid in the cell is down, hence that the cell needs recharging or is no longer able to take a charge.

Referring now to the drawing by numerals of reference, and first to the embodiment of the invention shown in FIGS. 1 through 3, 10 denotes the top wall of one cell of a conventional multiple cell storage battery. Each cell has a plurality of conventional plates 12 which are adapted to be covered by an electrolytic liquid 14. Each cell 10 has a filler opening 16 which is threaded at 18 and through which liquid 14 is poured to fill or replenish the battery to the proper level. Integral with the top wall 10 around each filler opening 16 is a depending portion 20 which is open at its bottom as denoted at 22 and which has diametrically disposed, elongate vent slots in it as indicated at 21. An internal annular shoulder 24 is formed on depending portion or extension 20 around the opening 22. When the level of liquid in the battery is normal, the battery plates 12 are covered and the liquid reaches the top of the shoulder 24.

For closing each filler opening 16, a combination battery vent cap and indicator made according to this invention and designated generally at 25 is provided. The cap portion of the combination cap and indicator is made of plastic. It has an intermediate portion 26 which is threaded at 28 for threading into the threaded portion 18 of the filler well opening. At its top the cap portion is of enlarged diameter as compared with the intermediate portion 26, and has a knurled perimeter 32 to provide a grip for manually threading and unthreading the combination cap-indicator 25 into or out of the filler opening; and below the threaded portion 26 the cap portion has a depending skirt 30.

The skirt portion has an axial bore 34 of a diameter that has a tight slip fit on a tubular float guide 27 which is preferably molded from a single piece of transparent plastic material. The float guide 27 is adjustable axially in the bore 34. Its top 44 is closed and has a plurality of vent holes 46 through it. Vent holes 51 are also formed in the side wall of the float guide intermediate its ends. At its lower end the float guide 27 has an annular rib 48 which is adapted to rest on the shoulder 24 of the filler well extension 20. The bore of the guide at its lower end has a reduced internal diameter.

The knurled portion 32 of the cap is hollow and its chamber or counterbore 36 formed by this hollow portion is of larger diameter than bore 34. Closing the chamber 36 is a cover 38 made of a molded transparent plastic material and provided with a plurality of vent holes 42. This cover has an annular rib 40 on its underside that press-fits into the counterbore 36 to locate and seal the cover 38 to the cap.

The float 31 is molded preferably from two pieces of suitable plastic material sealed together. It is mounted in the guide tube 27, to reciprocate therein. The main portion of the float is a tube closed at its lower end. The other part of the float is a brilliantly colored disc 52 which closes the top of the float and which is fastened to the main body of the float and which has an annular rib 54 that press fits into the tubular main portion. The disc 52 is brilliantly colored so that it can easily be viewed through the transparent top 44 of the guide 27. It has a plurality of bosses or projections 55 on its upper surface, which engage against the underside of the top 44, when the battery liquid level is normal to prevent the vent hols 46 from being closed by the disc 52 and also to reduce the contact area of the disc 52 with the top 44 to prevent adhesion of the float 31 to the top 44 when wet. The float 31 has a plurality of angularly-spaced, peripheral longitudinally-extending ribs or ridges 58 to reduce the contact area of the float with the guide 27 so that the float will move easily up or down in the guide 27 with change in level of the electrolyte in the battery cell. Each of the longitudinal ribs 58 has a radial projection 60 adjacent the upper end of the float which is adapted to engage against the reduced internal diametral portion of the lower end of the guide to prevent the float 31 from falling out of the guide 27 when the combined cap and indicator unit is removed from the battery. These projections 60 extend only slightly beyond the ribs 58 and because of the elasticity of the plastic, permit the float to be removed from the guide tube and inserted therein by slight endwise pressure.

The float 31 is properly weighted, to float so that the amount of the float 31 which is above the surface of the battery fluid, when the battery is normally charged, is substantially equal to the distance between the underside of the top 44 and the bottom end of the guide tube. Thus, when the liquid in the battery cell is at its normal desired level the top 52 of the float will be against the inside of the top 44 of the float guide. The distance between the top 44 and the disc 52 will therefore indicate at any time the variation of the liquid level in the battery cell from the recommended level.

To install the combination cap-indicator 25 in a conventional wet cell storage battery, the cap is threaded into the filler well opening 16 all the way. After the annular rib 48 on the guide 27 engages the top surface of the normal liquid level indicating shoulder 24 of the filler well extension 16, continued threading down of the cap will cause the guide tube 27 to be pushed axially upwardly in the bore 34 until the cap portion 32 seats on the top wall 10 of the battery. The float 31 is weighted so that its heighth above the liquid, when the cell is fully charged, is substantially equal to the distance between the underside of the top 44 and the bottom of the guide tube 27. Thus, when the battery liquid is at the level shown in FIG. 1, the bosses 55 on the float 31 will be in contact with the underside of the top 44 of the float guide 27. The window 38 on the top of the cap portion 32 permits the float 31 to be viewed and at the same time protects the top 44 of the float guide. The interior of the battery cell is vented through holes 51 in the guide 27, the vent holes 46, and the vent holes 42. Thus, the indicator 25 in no way interferes with the proper operation of the battery.

Figure 4:
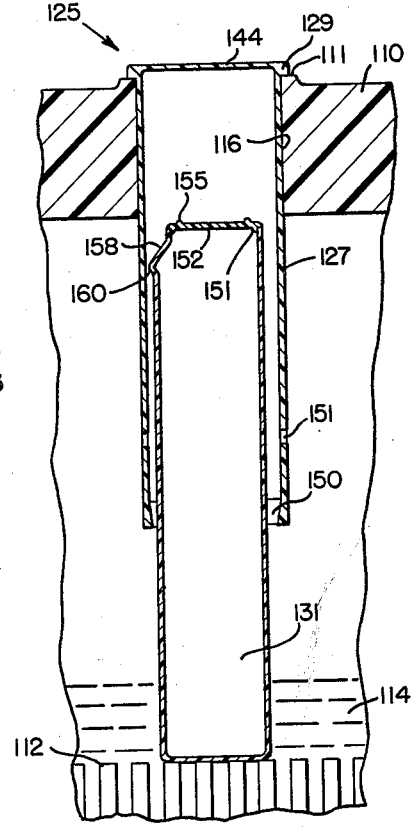
FIG. 4 is a fragmentary sectional view of a battery cell having installed therein an indicator constructed according to another embodiment of this invention, and further showing the indicator at its lowest position in the battery.
Figure 2:
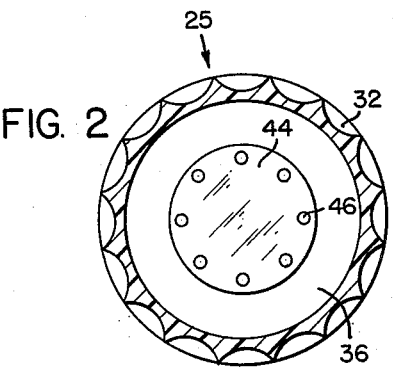
FIG. 2 is a sectional view taken on line 2—2 of FIG. 1 and looking in the direction of the arrows.
Figure 3:
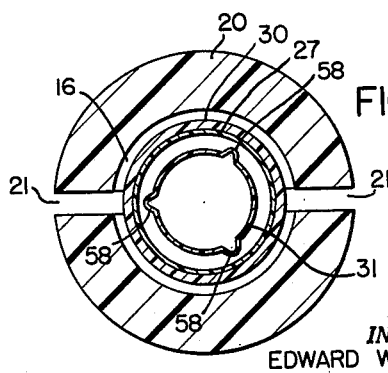
FIG. 3 is a sectional view taken on line 3—3 of FIG. 1 and looking in the direction of the arrows.

The modification of the invention, which is illustrated in FIG. 4, is designed to be installed with a light press fit in an opening formed in the top of a battery case, so that it may readily be removed for cleaning. For use with this embodiment of the invention, the battery case denoted at 110 has an opening 116 for each cell in which the float guide 127 of the combination cap and indicator 125 engages with a press fit. A flange 129 on the top of the float guide 127 rests on a shoulder 111 at the top of the battery case 110.

As before, a hollow member or float 131, which is made of a suitable plastic, is mounted to move axially in the guide tube 127. This float has a brilliantly colored top 152 attached by an annular shoulder 151 and provided with bosses which are adapted to engage the underside of the top 144 of the float guide when the float is at its highest position. The float 131 also has, as in the first-described embodiment of the invention, longitudinal ribs 158, each of which has a projection 160. These projections cooperate with the smaller diameter portion 150 at the bottom of the guide tube 127 to prevent the float 131 from falling out of the guide tube when it is removed for cleaning. The float is so weighted and its length is such that its bosses 155 contact the inside of the top 144 of the float guide when the battery is fully charged with battery liquid 114 and filled to the manufacturers' recommended level.

If the floats 31 and 131 should be observed to be low, and after the removal of the vent cap, the battery liquid appears to be at the recommended level, this indicates a low specific gravity reading of the battery fluid in the cell and thus a weak or low charge.

While the invention has been described in connection with two specific embodiments thereof, it will be understood that it is capable of further modification, and this application is intended to cover any variations, uses, or adaptations of the invention following, in general, the principles of the invention and including such departures from the present disclosure as come within known or customary practice in the art which the invention pertains and as may be applied to the essential features hereinbefore set forth, and as fall within the scope of the invention or the limits of the appended claims.

Having thus described our invention, what we claim is:

1. A liquid level indicator for a storage battery, comprising an elongate, flexible guide tube closed at its top and open at its bottom and adapted to be mounted in a storage battery cell, said tube having a transparent top and being of reduced inside diameter at its bottom, and a float mounted in said tube and extending through the open bottom thereof to float axially therein, said float having on its outside surface a plurality of angularly-spaced, longitudinally-extending ribs which project radially outwardly from its outside surface, at least certain of said ribs adjacent the top of said float having thereon further radial projections adapted to engage with the reduced internal diameter portion of said tube to prevent said float from dropping out of the bottom of said tube when the indicator is removed from a battery, said float being of a weight and length such that when the indicator is mounted in a normally charged battery cell the length of the portion of said float from its draft line to its top when floating in the liquid of the cell will be substantially equal to the distance between the underside of said tube top and the bottom of said tube, and said float having a plurality of upwardly-projecting bosses on its top to engage the underside of the top of said tube when the level of the liquid in the cell is normal, thereby to reduce the area of contact of the float with the top of the cell, said tube having vent holes intermediate its ends and in its top.

2. A combined vent plug and liquid level indicator device adapted to be placed into a flanged filler opening in a storage battery of the type having a skirt depending below its filler opening, said skirt having a flanged portion at its bottom projecting radially inwardly to indicate the normal level to which the cell should be filled with liquid, said combined plug and indicator device comprising a cap adapted to be threaded into said opening and having a transparent top and an axially extending bore, said bore being open at its lower end and terminating at its upper end in a vented chamber beneath said transparent top, a flexible tube positioned snugly in said bore for axial adjustment with respect thereto and extending downwardly beyond the open end thereof, said tube being perforated along its sides to provide vent holes, and having a perforated, transparent upper end and an open lower end which is of reduced inside diameter, a hollow, elongated float guided loosely in said tube and movable axially therein in response to a change in a predetermined condition of a battery liquid when the device is mounted in a battery filler opening, indicating means on the upper end of said float to be visible through the transparent upper end of said tube and the transparent top of said cap, and said tube having a radially outwardly projecting portion on its periphery at its lower end which is engageable with the flanged portion of said skirt to locate said tube axially in said skirt when said cap is threaded into said filler opening.

3. A combined vent plug and liquid level indicator for a storage battery, which has a filler opening for each battery cell that is internally threaded adjacent its upper end and that has a depending skirt portion around said opening which has locating means thereon, said combined vent plug and liquid level indicator comprising a cap portion which is adapted to be threaded into the filler opening of a cell of the storage battery and which has an axial bore, a flexible tubular guide mounted in said bore to extend into said depending skirt portion, said guide being closed at its top and open at its bottom, means on said guide positioned to cooperate with the locating means on said depending skirt portion to locate said guide axially in said filler opening, when said cap portion is threaded into said filler opening, and an elongate, cylindrical float mounted in said guide to move freely axially therein and to project below said guide and below said depending skirt portion into the liquid in the battery cell, the top of said guide being transparent to permit seeing the level of the float in said guide.

4. A combined vent plug and liquid level indicator as claimed in claim 3 wherein said cap portion has a hollow chamber at its top, and a transparent cover for said chamber, and said skirt portion, said guide, and said cover have communicating vent openings for venting said cell when said combined vent plug and liquid level indicator is in place in a battery.

5. A combined vent plug and liquid level indicator adapted to be mounted in a filler opening in the top wall of a wet cell storage battery of the type having an integral, annular skirt depending below the filler opening coaxially thereof, said skirt having at its bottom a radially inwardly projecting flange, the upper surface of which is positioned to indicate the normal level to which the cell should be filled with liquid, and having through its annular wall two diametrally opposite and vertically disposed slots extending upwardly from said skirt bottom to allow the escape of gas when the liquid level in the cell is above the skirt bottom, said combined vent plug and liquid level indicator device comprising a cap adapted to be threaded into said opening and having a perforated, transparent top and an axially extending bore, said bore being open at its lower end and terminating at its upper end in a vented chamber beneath said transparent top, a flexible tube having a tight, sliding fit in said bore for axial adjustment with respect thereto and extending axially downwardly beyond said lower end thereof, said tube having an open, lower end of reduced inside diameter, and an integral, radially outwardly projecting flange surrounding said lower end and adapted to overlie and seat upon the inwardly projecting flange on said skirt when said cap is threaded into said filler opening thereby to position said tube automatically and vertically in the bore in said cap, and said tube further having a closed, transparent upper end, and a plurality of perforations in its annular wall and upper end to permit gas passing through the slots in said skirt to exhaust into said vented chamber in said cap, and an elongate, hollow float of cylindrical configuration slidably mounted in said tube and extending from the lower end thereof to float on the liquid in said cell and to move axially in said tube in response to a change in a predetermined condition of said liquid, said float having a plurality of axially extending ribs projecting radially outwardly from its outer surface, and having a plurality of bosses projecting radially outwardly beyond said ribs adjacent the upper end of said float and engageable with the reduced diameter inside surface of said tube when said float is moved axially downwardly in said tube thereby to prevent said float from dropping out of the lower end of said tube in response to normal gravitational force, said float having an axial length sufficiently greater than the axial length of said tube so that when a respective battery cell is fully charged with liquid, said float floats on the liquid in said cell in such manner that the axial distance between its upper end to its draft line is equal to the axial distance from the inner face of the tube top to the surface at the lower end of the tube which rests on said skirt flange, whereby when said cell becomes less than fully charged, the distance which said float descends relative to the upper end of said tube as viewable through said transparent chamber cover and transparent tube end will be indicative of the variation of the density of the liquid in the cell.

References Cited in the file of this patent

UNITED STATES PATENTS

| | | |
|---|---|---|
| 1,703,233 | Hall et al. | Feb. 26, 1929 |
| 2,400,228 | Franz et al. | May 14, 1946 |
| 2,512,757 | Westall | June 27, 1950 |
| 2,610,221 | Keller | Sept. 9, 1952 |
| 2,616,941 | Lasko | Nov. 4, 1952 |
| 2,772,568 | Samaritano | Dec. 4, 1956 |
| 2,886,624 | Krukowski | May 12, 1959 |

FOREIGN PATENTS

| | | |
|---|---|---|
| 611,147 | Great Britain | Oct. 26, 1948 |